(12) United States Patent
Smith

(10) Patent No.: US 11,157,879 B2
(45) Date of Patent: Oct. 26, 2021

(54) SYSTEM AND METHODS FOR FACILITATING SCHEDULING OF EVENT OR MEETING

(71) Applicant: Netsuite Inc., San Mateo, CA (US)

(72) Inventor: Celestine Star Grady Smith, Redwood City, CA (US)

(73) Assignee: NETSUITE INC., San Mateo, CA (US)

( * ) Notice: Subject to any disclaimer, the term of this patent is extended or adjusted under 35 U.S.C. 154(b) by 873 days.

(21) Appl. No.: 14/993,968

(22) Filed: Jan. 12, 2016

(65) Prior Publication Data
US 2017/0236097 A1 Aug. 17, 2017

Related U.S. Application Data

(60) Provisional application No. 62/105,567, filed on Jan. 20, 2015.

(51) Int. Cl.
G06Q 10/10 (2012.01)
(52) U.S. Cl.
CPC ................ G06Q 10/1095 (2013.01)
(58) Field of Classification Search
CPC .. G06Q 10/1095; G06Q 10/109; G06Q 10/10; G06Q 10/1093; G06Q 10/6311; G06Q 10/06; G06Q 10/063116; G06Q 10/0631; G06Q 10/06312; G06Q 10/06314; H04L 12/1818; H04L 51/32; H04L 65/403; H04L 51/046; H04W 4/21
USPC ......... 379/88.19; 704/10; 705/7.19; 719/330
See application file for complete search history.

(56) References Cited

U.S. PATENT DOCUMENTS

| | | | |
|---|---|---|---|
| 4,626,836 A * | 12/1986 | Curtis | G06Q 10/109 |
| | | | 283/67 |
| 7,236,976 B2 | 6/2007 | Breitenbach et al. | |
| 8,200,520 B2 | 6/2012 | Chen et al. | |
| 8,433,753 B2 | 4/2013 | Qi | |
| 9,733,921 B1 | 8/2017 | Saenz et al. | |
| 9,817,991 B2 | 11/2017 | Boncha et al. | |
| 2002/0049868 A1* | 4/2002 | Okada | G06F 17/30616 |
| | | | 719/330 |
| 2004/0122661 A1* | 6/2004 | Hawkinson | G06F 17/2785 |
| | | | 704/10 |
| 2005/0091095 A1* | 4/2005 | Wilbrink | G06Q 10/06314 |
| | | | 705/7.19 |
| 2005/0201533 A1* | 9/2005 | Emam | H04M 1/2535 |
| | | | 379/88.19 |

(Continued)

FOREIGN PATENT DOCUMENTS

KR 101311127 B1 * 9/2013 ....... G06Q 10/06314

OTHER PUBLICATIONS

IPCOM000228220D (Disclosed Anonymously) Jun. 13, 2013. [online] [retrieved on Feb. 9, 2021], Retrieved from: ip.com Database (Year: 2013).*

Primary Examiner — Jerry O'Connor
Assistant Examiner — Michael R Koester
(74) Attorney, Agent, or Firm — Kraguljac Law Group, LLC

(57) ABSTRACT

Systems and methods for scheduling a meeting or event in a manner that is more efficient than conventional systems or dedicated applications, and can be configured to take into account sources of information available on a common platform or available within a common account (such as calendars, locations, preferences, etc.).

24 Claims, 10 Drawing Sheets

(56) References Cited

U.S. PATENT DOCUMENTS

| | | | |
|---|---|---|---|
| 2007/0073810 A1* | 3/2007 | Adams | G06Q 10/107 709/205 |
| 2010/0005142 A1* | 1/2010 | Xiao | H04L 67/24 709/204 |
| 2011/0054976 A1* | 3/2011 | Adler | G06Q 10/109 705/7.18 |
| 2012/0143961 A1* | 6/2012 | Jonsson | G06Q 10/1093 709/206 |
| 2012/0150581 A1* | 6/2012 | McPhail | G06Q 10/109 705/7.19 |
| 2014/0047023 A1* | 2/2014 | Baldwin | G06Q 30/02 709/204 |
| 2014/0208325 A1* | 7/2014 | Chen | G06Q 10/107 718/102 |

* cited by examiner

To: Sue@company.com; Bob@company.com
CC: events@company.com
From: Sara@company.com
Subject: Meet next week for Patent Idea Discussion?

Hi Folks,
I have some new ideas to review for the patent program. Can we meet next week to discuss?
Thanks,
Sara

Figure 4(a)(1)

EVENT PREFERENCE FOR SARA

FOR USER    Sara
TIME ZONE   Pacific
OFFICE      San Mateo

MY PREFERENCES
ROOM
1st Floor Board Room
1st Floor White
Sequoia Room

DAYS OF WEEK
Tuesday
Wednesday
Thursday
Monday
Friday

TIME OF DAY
Late Morning (10-12)
Late Afternoon (3-5)
Early Afternoon (1-3)
Lunch (12-1)
Early Morning (8-10)
Evening (5-7)

Figure 4(a)(2)

To: sue@company.com; bob@company.com; sara@company.com
CC: events@company.com
From: events@company.com
Subject: RE: Meet next week for Patent Idea Discussion?

The following meeting options are available next week for Patent Idea Discussion Option 1: Monday January 5th; 10AM; 1st Floor White Option 2: Monday January 5th; 2PM; Webex (no room available)

Option 3: Wednesday January 7th; 11AM; 4th Floor Yosemite

Reply "Select Option #" to schedule one of these options, or reply "More Options" to search again.

From: sara@compnay.com
Subject: Meet next week for Patent Idea Discussion?

Hi folks,
I have some new ideas to review for the patent program. Can we meet next week to discuss?
Thanks,
Sara

Figure 4(b)(1)

To: sue@company.com; bob@company.com;;
CC: events@company.com;
From: sara@company.com;
Subject: RE: Meet next week for Patent Idea Discussion?

Ok – we will Select option 3

From: sue@company.com;
Subject: RE: Meet next week for Patent Idea Discussion?

Wednesday is OK for me as well.

From: bob@company.com;
Subject: RE: Meet next week for Patent Idea Discussion?

Monday morning is too busy – 1st day back from holiday. Wednesday would be fine with me.

From: sara@company.com;
Subject: RE: Meet next week for Patent Idea Discussion?

I'd prefer to go over these in person if possible;
does Monday or Wednesday work?

From: events@company.com;
Subject: RE: Meet next week for Patent Idea Discussion?

The following meeting options are available next week for Patent Idea Discussion Option 1: Monday January 5th; 10AM; 1st Floor White
... .... ...

Figure 4(c)(1)

To: sue@company.com; bob@company.com; ;
From: sara@company.com;
Subject: Patent Idea Discussion

Title: Patent Idea Discussion
Message: Scheduled by Email Facilitated Event Scheduler
Date: Wednesday January 7, 2015
Time: From 11:00 am to 12:00 pm (Pacific Standard Time)
Frequency: One time event on Wednesday January 7, 2015
Location: 4th Floor Yosemite
Invited Attendees:
BOB
SARA
SUE

- Accept event without sending a response
- Accept event and send a response to SARA
- Decline event without sending a response
- Decline event and send a response to SARA View event

Figure 4(c)(2)

SYSTEM AND METHODS FOR FACILITATING SCHEDULING OF EVENT OR MEETING

CROSS REFERENCE TO RELATED APPLICATION

This application claims the benefit of U.S. Provisional Application No. 62/105,567 filed Jan. 20, 2015, which is incorporated herein by reference in its entirety (including the Appendix) for all purposes.

BACKGROUND

Meetings and events are a necessary part of operating a business by providing opportunities for discussion, communicating information, and reaching decisions. Unfortunately, conventional methods of setting up meetings and events often involve a repetitive cycle of requesting/suggesting a meeting with one or more people at a specified date and time, modifying the original plan in response to the unavailability or preferences of an invitee, proposing the modified schedule to the invitees, and repeating this cycle as needed until a mutually agreeable schedule is found. This can be made even more difficult due to the various commitments that each of the participants already have or are planning to have.

This is inefficient and can become even more so when invitees are located in different time zones and geographic locations, which may necessitate coordinating meeting times between time zones, and finding available meeting space in multiple locations. Conventional approaches to meeting or event scheduling often require a significant amount of user interaction or investigation in order to coordinate schedules between attendees, meeting rooms, conflicting commitments, and other resources (such as audio-visual equipment).

Conventional approaches to meeting or event scheduling often utilize a dedicated application or process that requires multiple interactions between users and between users and the application in order to establish a suitable schedule for a meeting or event. Each prospective invitee may contribute their own alternate proposal for a meeting day, time, or place, with one or more "rounds" of negotiation typically required to reach agreement or even a consensus. Further, conventional approaches also often require the use of a different application or mode of communication in order to resolve conflicts, discuss options, etc.; this is both inefficient and frustrating for users. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for more efficient scheduling of meetings or events. Embodiments of the inventive system and methods may be used to automate aspects of the scheduling process by recommending a meeting time given the attendees, their schedules, and any relevant meeting variables. In some embodiments, the inventive system and methods enable "on-the-go" event scheduling that is more easily executed than conventional methods. For example, instead of having to check invitees' schedules, a user need only send an email/message that triggers a set of processes that generate a suggested schedule for a meeting. Another benefit of the invention is that by using email or another communications mode as an interface, it facilitates dialog between the attendees, so options can be more easily and quickly discussed before settling on a meeting time, place, list of attendees, agenda, etc.

In one embodiment, the invention is directed to a computer implemented method for scheduling a meeting or event, where the method includes:
  receiving a communication from an organizer of a proposed meeting or event, the communication being a message addressed to a specific address associated with a scheduling process;
  processing the received message to determine certain information related to the proposed meeting or event;
  based on the determined information, accessing data regarding the scheduling preferences for one or more of the attendees of the proposed meeting or event;
  determining one or more possible options for scheduling the proposed meeting or event;
  generating a message to one or more of the attendees of the proposed meeting or event, the generated message including the one or more possible options for scheduling the proposed meeting or event;
  receiving a message from the organizer of the proposed meeting or event, the received message including a selection of one of the one or more possible options for scheduling the proposed meeting or event; and
  scheduling the proposed meeting or event based on the selected option.

In another embodiment, the invention is directed to a system for scheduling a meeting or event, where the system includes:
  one or more business related data processing applications installed in the system;
  a data storage element coupled to the one or more business related data processing applications;
  a processor programmed with a set of instructions, wherein when executed by the processor, the instructions cause the system to
  receive a communication from an organizer of a proposed meeting or event, the communication being a message addressed to a specific address associated with a scheduling process;
  process the received message to determine certain information related to the proposed meeting or event;
  based on the determined information, access data regarding the scheduling preferences for one or more of the attendees of the proposed meeting or event;
  determine one or more possible options for scheduling the proposed meeting or event;

generate a message to one or more of the attendees of the proposed meeting or event, the generated message including the one or more possible options for scheduling the proposed meeting or event;

receive a message from the organizer of the proposed meeting or event, the received message including a selection of one of the one or more possible options for scheduling the proposed meeting or event; and schedule the proposed meeting or event based on the selected option.

In yet another embodiment, the invention is directed to an apparatus for scheduling a meeting or event, where the apparatus includes:

an electronic data processing element;

a set of instructions stored on a non-transient medium and executable by the electronic data processing element, which when executed cause the apparatus to receive a communication from an organizer of a proposed meeting or event, the communication being a message addressed to a specific address associated with a scheduling process;

process the received message to determine certain information related to the proposed meeting or event;

based on the determined information, access data regarding the scheduling preferences for one or more of the attendees of the proposed meeting or event;

determine one or more possible options for scheduling the proposed meeting or event;

generate a message to one or more of the attendees of the proposed meeting or event, the generated message including the one or more possible options for scheduling the proposed meeting or event;

receive a message from the organizer of the proposed meeting or event, the received message including a selection of one of the one or more possible options for scheduling the proposed meeting or event; and schedule the proposed meeting or event based on the selected option.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 4(a)(1) is an example message which may be used to initiate an embodiment of the inventive process and which may be structured in the indicated format (or in another suitable combination of information and formatting); FIG. 4(a)(2) is an example of a data record for a user's event preferences that may be used when implementing an embodiment of the inventive system and methods; FIG. 4(b)(1) is an example (in the form of an email) of a message which may provide each user/attendee a copy of their personal calendar for a range of dates so that they can make an informed decision; FIG. 4(c)(1) is an example of a message (in the form of an email) which indicates a selected option or options for the event or meeting (note that the Scheduler may be configured to send such a message to the users/attendees upon receipt of one from the organizer); and FIG. 4(c)(2) is an example of a message (in the form of an email) which provides confirmation and calendar scheduling information for the selected option or options for the event or meeting (note that the Scheduler may be configured to send such a confirmation message to the users/attendees upon receipt of one from the organizer)

Note that the same numbers are used throughout the disclosure and figures to reference like components and features.

DETAILED DESCRIPTION

Figure 1:
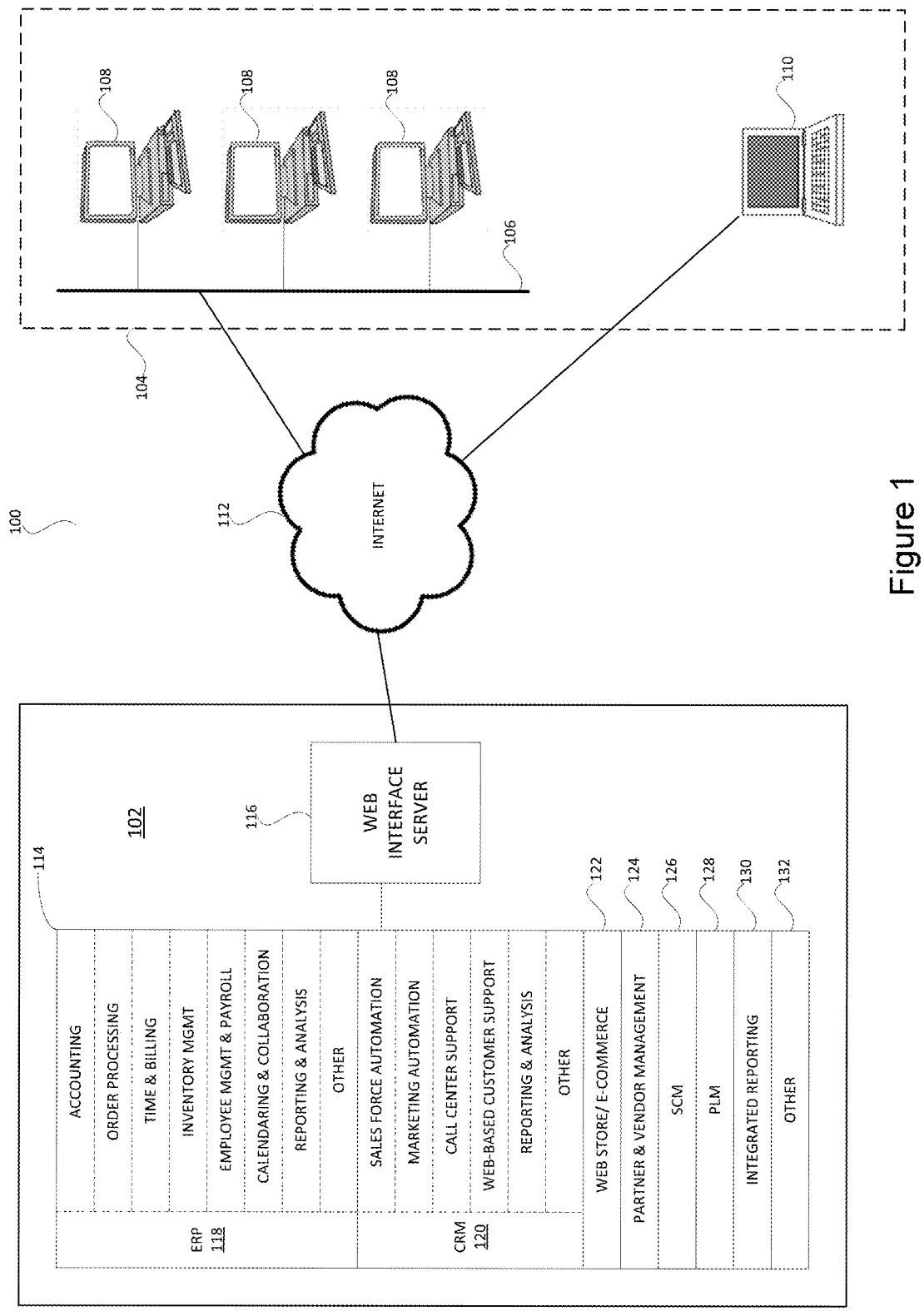
FIG. 1 is a diagram illustrating a system 100, including an integrated business system 102 and an enterprise network 104 in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or any other suitable form. The following detailed description is, therefore, not to be taken in a limiting sense.

In some embodiments, the invention is directed to systems, apparatuses, and methods for scheduling a meeting or event. In one embodiment, an internal "event scheduling" process or application may be initiated/executed by use of a request contained in an email message or other form of communication. The internal process or application may access one or more sources or types of information residing on a common service platform to determine a proposed meeting or event day, time, location, etc. The characteristics of the proposed meeting or event are then communicated to the prospective attendees, who may communicate amongst themselves using the same type of message or form of communication as used to initiate the scheduling process. Once an agreed upon schedule is determined, a message sent to the internal process or application may be used to confirm the schedule and establish the meeting or event.

In some embodiments, the invention may be implemented in the context of a multi-tenant, "cloud" based environment (such as a multi-tenant business data processing platform), typically used to develop and provide web services for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc.

One advantage of implementing an embodiment of the inventive system and methods as part of (or in conjunction with) a centralized data processing platform is that it may permit the scheduling functions to have access to other data that can be used as part of the scheduling process. Such data may include organizational structure data, corporate events data, business status data (e.g., to identify business cycles during which certain people may not be available), human resources data (e.g., to identify absences for certain people, etc.), etc. This data may be subjected to modeling, machine learning, or data mining in order to determine its significance to the availability of a particular person or group.

In addition to determining or helping to determine attendee availability, data from a multi-tenant system can also be used by the invention to make "smart" suggestions for event times and locations. Information from human resources about hierarchy, location, tenure or position is available and can be compared across meeting attendees; in this way the invention can suggest event times and locations that work best for the more senior attendees or prospective attendees. These preferred times can be determined in several ways, including but not limited to machine learning and analysis of past and current schedules, individual user preferences that each user in the system defines, or a combination of both analysis and user preferences.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
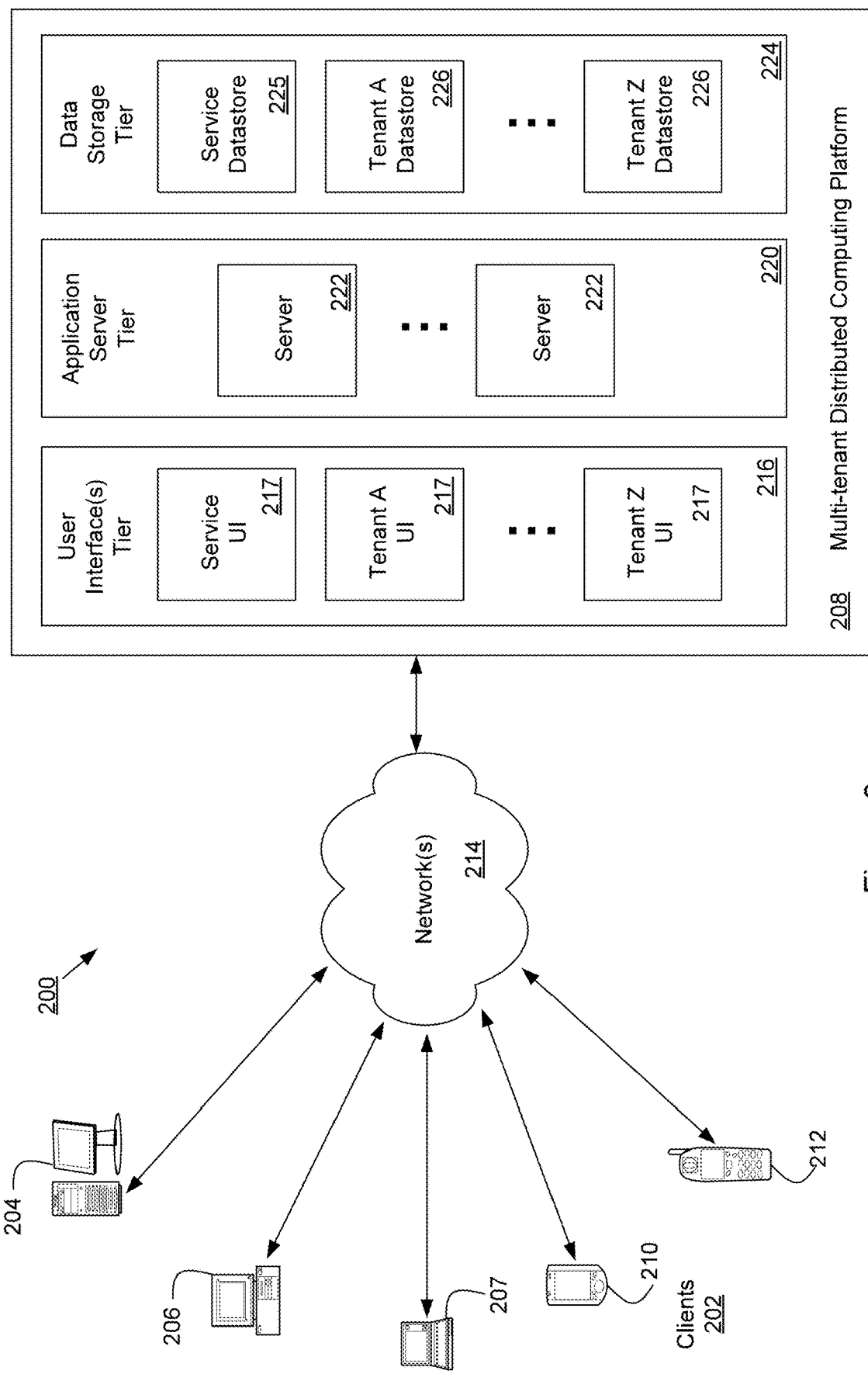
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations.

For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of an integrated service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 2 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, etc. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party (i.e., a platform operator, manager, or administrator) may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users, including customers and employees. Some of those multiple users may have distinct roles or responsibilities within the business or entity. As a result, such users may have a need or preference to utilize certain components of a user interface or other functional aspects of the computing/data processing platform when performing their functions.

In some cases, a tenant may desire to modify or supplement the functionality of an existing platform application by introducing an extension to that application, where the extension is to be made available to the tenant's employees and/or customers. In some cases such an extension may be applied to the processing of one or more types of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as in the case of an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension.

As an example, certain of the functional capabilities of the scheduling system and methods described herein may be implemented in the form of an extension to, or sub-routine of, an existing email or messaging system. This would enable users of such a messaging system to incorporate the inventive scheduling functions and methods into their use of a known messaging system, and extend the benefits of such a system. Furthermore, if the extended messaging system were implemented as a feature of a single or multi-tenant business data processing platform, then the scheduling functionality would also have access to data that might be of assistance in performing certain of the scheduling functions; this might be beneficial as part of resolving potential scheduling conflicts, determining the relative importance of certain prospective attendees, being alerted to the existence of a possibly conflicting event or indicator of an emergency that could impact the availability of certain of the people invited to a meeting or event, etc.

Figure 3:
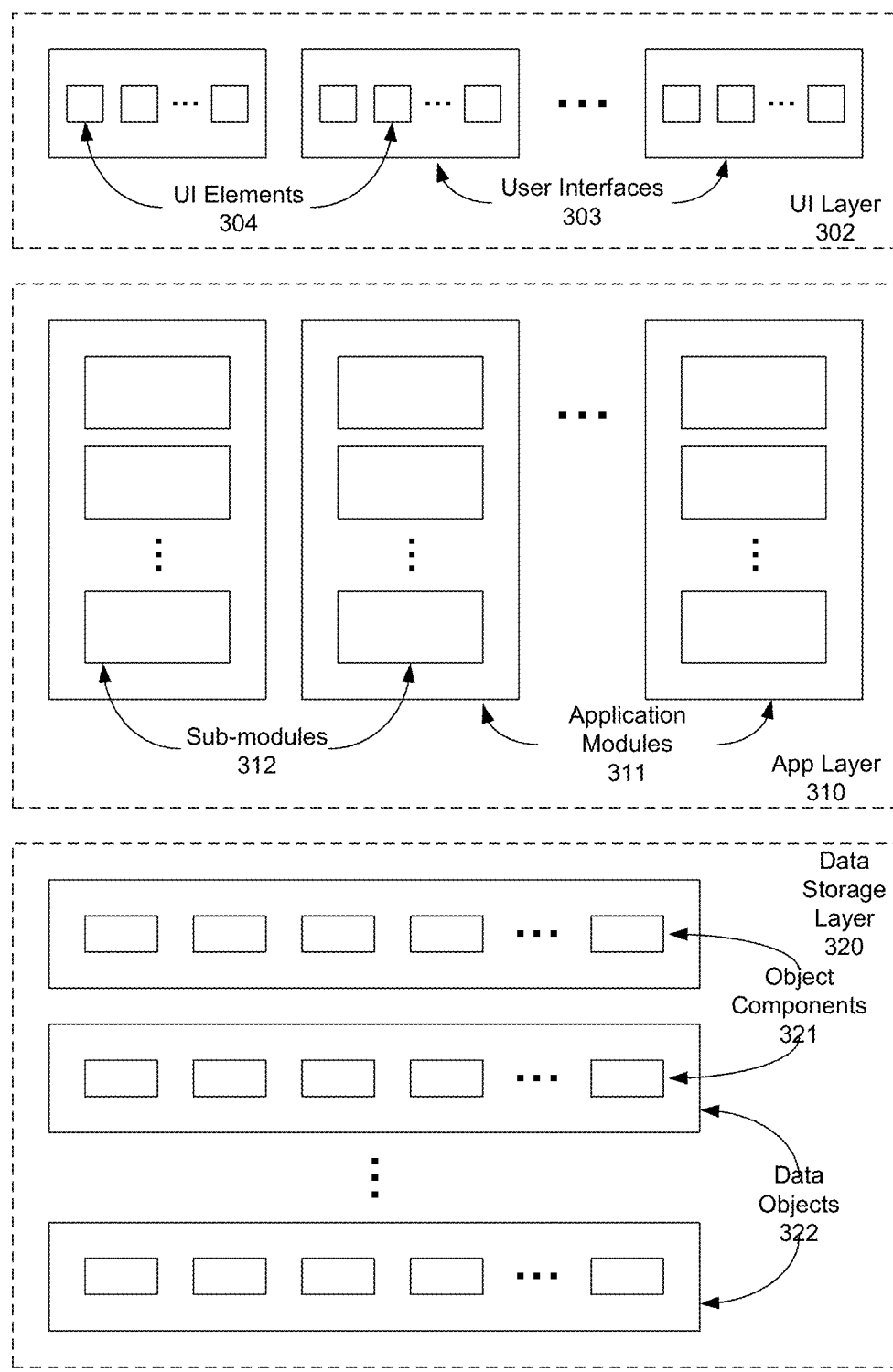
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 3 represents an example of a software system to which an embodiment of the invention may be applied, i.e., in which it may be implemented. In general, an embodiment of the invention may be implemented by a suitable set of software instructions that are designed to be executed by a suitably programmed processing element (such as a CPU, microprocessor, processor, controller, computing device, server, processing platform, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (such as to support or implement an ERP, CRM, eCommerce, or platform administrative feature or function). Such function, method, process, or operation may include those used to implement one or more aspects of the inventive system and methods, such as for:

- Enabling a user to execute a set of processes for scheduling a meeting or event using an email message or other form of communication directed to a specific internal process;
- Implementing the internal process to determine one or more characteristics of a proposed meeting or event, such as a day, a time, a location, a list of prospective attendees, etc., taking into account one or more of the respective schedules, commitments, locations, time zones or other available information about one or more of the prospective attendees—this may include consideration of the relative importance of a person to a meeting or to other meetings, the state of the business operations of a company and how that may impact possible meeting days or times, business related data that may be indicative of a demand for resources that would otherwise be available for the meeting (such as rooms, equipment, personnel, etc.), and may also involve application of one or more sets of rules or conflict resolution procedures;
- Generating one or more communications with one or more of the prospective attendees to communicate a proposed meeting or event schedule, or a set of possible options for an event or meeting;
- Receiving an indication from an event or meeting organizer (or other prospective attendee) regarding a preferred event or meeting time, location, etc.; and
- Based on the preferred event or meeting parameters, generating an event or meeting invitation and communicating information regarding the event or meeting to the prospective attendees (this may include automatically generating an event notification, calendar entry, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to exchange communications, and that serves as a host for business related data stored in a data storage element (e.g., a database) that can be accessed directly by a user or remotely over a network. Further example environments in which an embodiment of the invention may be implemented include devices, software applications, systems, processing platforms, apparatuses, or other elements or components that are used to acquire and process data related to the operations of a business or company, including but not limited to HR related data, business or corporate events data, business metrics data, business organizational structure data, etc. Although further examples below may reference the example computing environment depicted in FIGS. 1-3, it will be apparent to one of skill in the art that the examples may be adapted for alternate computing devices, systems, apparatuses, processes, and environments.

The method of communication used for triggering the event scheduling process implemented by an embodiment of the invention may be email, text/SMS message, a chat interface such as instant messaging, an online form, or a telephony integrated phone system, and may include virtually any type of communication mode where the inventive system can be copied on and can monitor a discussion about scheduling an event. Once an event option has been selected, the inventive scheduler can create an event in a calendar system. In addition to the types of uses described, other possible actions scheduled or initiated by the invention may include those obtained through integration with 3$^{rd}$ party scheduling systems via a suitable API; for example, making restaurant reservations, booking travel, creating an event in a self-service ticketing platform, etc.

Figure 4A:
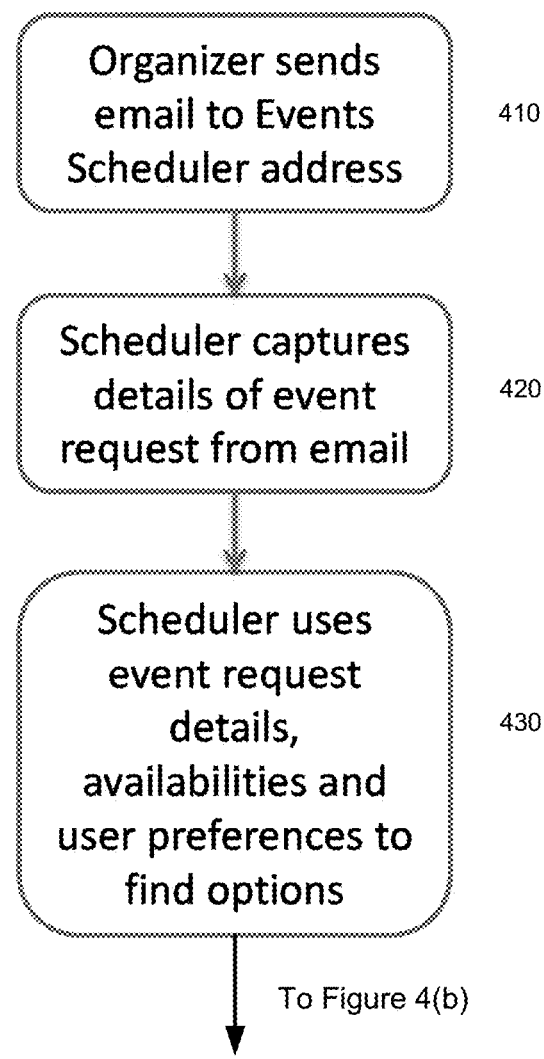
FIGS. 4(a), 4(b), and 4(c) are flowcharts or flow diagrams illustrating aspects of an exemplary method, process, function, or operation that may be used in an implementation of an embodiment of the invention. More specifically.
Figure 4B:
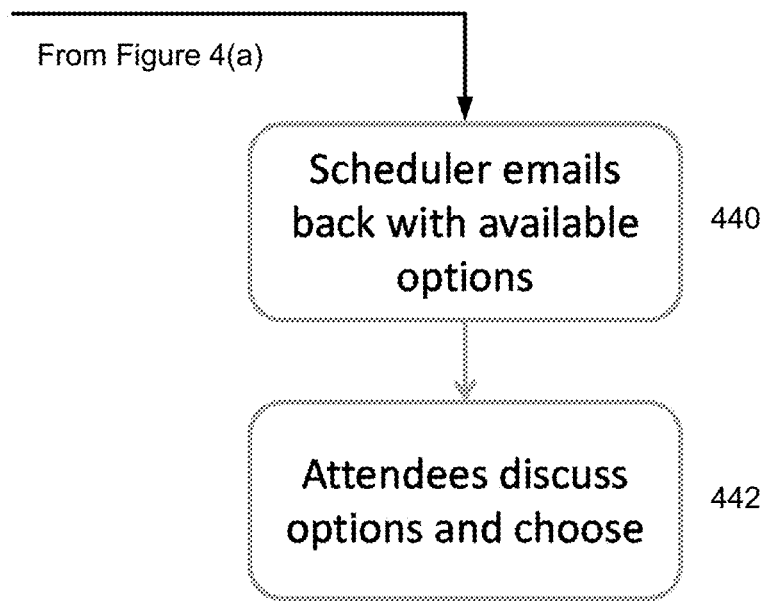
Figure 4C:
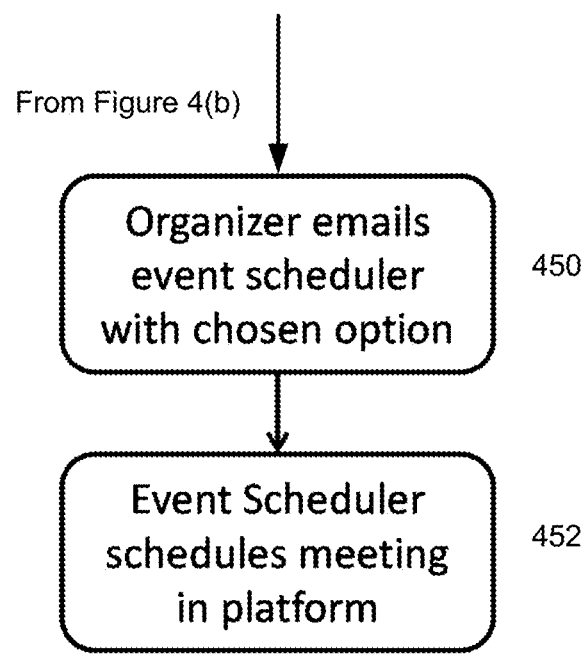

FIGS. 4(a), 4(b), and 4(c) are flowcharts or flow diagrams illustrating aspects of an exemplary method, process, function, or operation that may be used in an implementation of an embodiment of the invention. As will be described, in some embodiments of the event scheduling process, the process may implement one or more of the following functions or operations:
  receive an event scheduling request message;
  determine event details, such as organizer, attendees, suggested time/location from the received message/email;
  access data relevant to organizer and attendee preferences, availability, hierarchy, and other business objects relevant to the proposed event or meeting;
  analyze organizer and attendee preferences, and organizer and attendee/resource availability to determine possible options for the event or meeting time, date, location, duration, etc.;
  provide one or more of the event or meeting options to the potential attendees;
  in response to the provided options, receive a message containing a selection of a desired option from one or more of the prospective attendees;
  based on the received message or messages, generate a proposed schedule for the event or meeting based on the selected option(s); and
  schedule the event in a calendar system and/or make additional data records based on a selected event option.

Referring to FIG. 4(a), this diagram illustrates aspects of the "discovery" phase of the inventive scheduling system and methods. As suggested by the figure, in one embodiment a meeting scheduler or organizer (typically a human user, but could also be an internal process triggered by another event) generates a message (such as an email) that is addressed to an Event Scheduling process or task (as suggested by step or stage 410 of FIG. 4(a)). In some embodiments, this message may include the following information and be structured in the indicated format (or in another suitable combination of information and formatting):
  In the "To" field/line are the other attendees;
  In the "CC" field/line is an address that routes the email as a request to the event scheduler process;
  In the "From" field/line is the organizer's address; and
  The "Subject" field/line contains a suggested time frame and meeting topic.

An example of such a message is shown in FIG. 4(a)(1). The example email will be routed to an internal process as a result of the "CC" address, "events@company.com". This internal process will execute one or more of the methods, functions, operations, etc. described herein in order to enable the scheduling tasks.

In some embodiments, integration of the inventive scheduling processes with an existing mail system may be accomplished through the execution of a script that operates to parse and interpret a received message. As an example, when an email is sent to the internal process address, it may be received by a server which executes a specific script upon receipt. The script causes a parsing of the contents of the communication, and captures certain information, for example (but not limited to, or required for all use cases), the address lines, subject and message. This data or information is used as a parameter or variable for continuing to search for schedule options or to schedule the event. Note that while the figures show an example of using email as the communication platform for discussing the event, the invention could be implemented with other platforms, including email, text messages, chat interfaces, etc. Those implementations would similarly use details of the communication to identify the attendees and parse the message for script parameters or variables.

As noted, in this example an email is received by the internal scheduling process and is then parsed and evaluated by that process in order to extract information needed to initiate the functions of the scheduling process (as suggested by step or stage 420 of FIG. 4(a)). The internal "Scheduler" process captures details about the event request from the email by searching the email to identify the user(s) who are organizing and attending the event, the purpose of the event, and a suggested date/time for the event. As an example, this information may be determined in any suitable way, such as by the following:
  Event Organizer and Prospective Attendees—may be determined from the email fields. The person sending the email is identified as the event organizer, the people that the email is sent to are the additional potential attendees. The scheduler process looks up data related for these users (such as title, organizational position, calendar, etc.) by using their email address as an index into the relevant business/corporate data.
  For other communication platforms, a phone number, username or handle could be used to identify the event organizers and attendees.

Note that a table that contains user information in a multi-tenant system may also contain other business/organizational data about the user, including their position, level in the organization, tenure, location, and event preferences. If such a data structure did not exist it could be created by a separate process that accessed relevant HR and calendar data that resides on a common data processing platform.

Event Title—the Scheduler looks for text in the subject of email that follows a "for" or "to" and takes the text following that as a prospective title or topic for the event:

"Meet for Patent Idea Discussion" causes the Title to be "Patent idea Discussion";

"Meet to Review sales quotas" causes the Title to be "Review Sales Quotas"; or

Uses a default value—if no "for" or "to" terms found, then causes title to be "Meeting with <Organizer>";

With other modes of communication, messages can similarly be parsed and interpreted to obtain details on what event the attendees want to create.

Target Fields for event scheduling—here the Scheduler attempts to determine a prospective date and/or time for the event by searching for keyword(s) in the email message:

Target Range: tries to identify text such as "This Week", "Next Week", "This Month", "Next Month", etc.;

Target Days: tries to identify text such as "Monday", "Tuesday", etc.;

Target Date: tries to identify specific dates (January 7, 02/12, etc.);

Target Time: tries to identify time of day clues, such as "morning", "afternoon", "evening", "lunch", etc.); or Target Length: tries to identify meeting length clues (e.g., "30 minutes", "2 hours", etc.).

Note that these terms or parameters are not required to be in a message and that the parameters will only be set by the scheduling process if the executing script can detect relevant text or data.

Note further that in some embodiments, the script or process used to parse and interpret a message may depend on a characteristic of the message itself. For example, based on the sender or on one or more of the invitees, a specific set of conflict resolution rules may be adopted for determining the most suitable day, time, or location for a meeting. Similarly, based on a characteristic of the sender, recipients, or message content, a specific dictionary, set of phrases, terms of art, set of priorities, etc. may be utilized in the scheduling process.

This permits the Scheduler (if desired) to access a set of rules or guidelines for use in parsing and interpreting the message that are based on one or more relevant characteristics or parameters; in a broad sense, these may relate to a characteristic of one or more of the event, the event originator, the prospective attendees, the date, the location, the purpose, the current state of the business, the number of executives attending, etc. Such rules or guidelines may be applied to provide a specific set of interpretations of text or images in a message for certain situations. After identifying relevant data, the Scheduler may construct a data element in which the identified information for the event or meeting is stored in one or more fields for further processing and use.

Further examples of the customized or dynamic processing of a message include searching for elements in the message details that would trigger the creation of different types of events and records. For example, the identifying the word "recurring" can cause the scheduler to create a recurring event. Identifying the term "schedule webex" can cause the process to an event and add a WebEx session to the event. If the message included the phrase "at Jack's restaurant" then the scheduler can submit a web form to make a reservation at a restaurant. Similarly, if the message included the phrase "host public conference", then the scheduler can create a public event using a self-service ticketing platform. Such uses are examples of where the inventive scheduling process can initiate the execution of associated tasks that might otherwise require a separate process.

Next, the Scheduler uses the information extracted from the event request message to determine one or more possible options for the date, time, location, etc. of the event or meeting (as suggested by step or stage 430 of FIG. 4(*a*)). In some embodiments this may involve accessing information related to each of the prospective participant's calendars (to indicate potential availability, any constraints on attendance, etc.), event scheduling preferences (to indicate preferred times of day, days of the week, locations, duration, etc.), or business data or events (to indicate possible events or a state of the business that might impact the availability of one or more of the prospective attendees) from a suitable data store. This data store may include a set of previously submitted preferences and/or constraints that were provided by employees, and may be organized in any suitable manner (such as alphabetically, by working group, by title, etc.). If organized by group, title, or function, for example, one or more rules or constraints may apply to each person in the group or functional area (such as that all managers are unavailable certain days or if certain business conditions (end of the quarter) are present).

In some cases, such preferences may be inferred or determined based on previous activity—for example, the Scheduler may determine that a certain person does not make appointments on certain days, or if certain business conditions are met (such as end of quarter, near an important trade show, etc.). In this case the Scheduler may avoid proposing such a day even if that day appears available based on the person's calendar. In general, the event preferences may have one or more of the following characteristics:

The preferences may be selected by an individual and/or determined by analysis of data that may be relevant to the person's availability for an event or meeting (such as role, office location, levels of responsibility, prior commitments or habits, deadlines for other tasks that they participate in, etc.)—the preference data or definition may be stored and indexed (typically by name and/or email address) for ease of access;

The Scheduler process attempts to locate and access user preference data for each user/person specified in the event request (e.g., employee, contact, partner, customer, vendor etc.);

Each user may be provided tools to enable them to edit their own Event Preference record/data and insert temporary or long term flags/parameters regarding availability or preferences;

Some of the preference data may be provided by application of appropriate analytics/rules—for example, as a default value one or more of the following may be used:
Set time zone from user preference;
Set preferred room, time of day, days available based on events attended in last (1-3) months; or
Set duration of availability based on observed attendance pattern in past;

Based on the users' locations, the scheduler can access a holiday calendar for that specific location to schedule around local holidays, business closings, etc.;

The Scheduler can look at the available conference room resources in a facilities table to search for an appropriate event space as a function of location. Resource tables can also contain data about # seats or available equipment, and if included in the details of the message, the scheduler can search for rooms/locations that meet the requirements, "seats 10", "has projector", "high ceiling", "second floor", etc.; and The Scheduler can look into a "time off" or PTO management system to determine the expected upcoming time off for each user in case that should impact the scheduling process.

The accessed preference data is used by the Scheduler process to suggest a day and/or time for the proposed event. An example of a data record for a user's event preferences that may be used when implementing an embodiment of the inventive system and methods is shown in FIG. 4(a)(2). Note that a user's preference data may include information related to day of week, time of day, location, available meeting resources, topics of interest, etc.

Note that in determining a proposed date, time, or location for an event, the Scheduler may apply one or more of several possible strategies; these include, but are not limited to logic such as:

(1) Attempt to find at least an amount of time equal to a pre-set minimum that can be scheduled in a way that enables all of the attendees to attend, either in person or via video conferencing;

(2) If (1) is not possible, then attempt to find at least an amount of time equal to a pre-set minimum that can be scheduled in a way that enables the "essential" or "required" attendees to attend;

(3) If (2) is not possible, then attempt to find at least an amount of time equal to a pre-set minimum that can be scheduled in a way that enables a senior member of the same department as the "essential" or "required" attendees to attend;

(4) Given potentially available times for a meeting or event, a scheduler can select one or more options to present to the prospective attendees. The options it presents may be selected based on a rule, heuristic, threshold, or individual or group preference data, and may follow one or more of the following guidelines:

(1) Look for options that best fit with most senior attendees preference;

(2) Look for options that best fit with organizers preference;

(3) Look for options on days that are least busy (measured by % of day booked) for either the greatest number of attendees, the organizer, or the most senior attendees; or (4) Look for options that offer some buffer time between this meeting and other meetings for the greatest number of attendees, the organizer, or the most senior attendees; and A suitable weighting can be applied to an option based on the criteria it fits (e.g., can organizer attend, can senior member attend, additional weight for each optional attendee, etc.). This weighting could be controlled via system preferences and used to generate a "score" for each possible meeting or event schedule. If the score exceeded a specified threshold, then the potential meeting or event schedule may be presented to the prospective invitees as an option, or as the primary option.

Note that instead or using a list of "essential" or "required" attendees to determine the priorities for scheduling, each prospective attendee can be associated with a metric that reflects their importance to the discussion(s) or activities expected at the event. This allows a greater weighting to be assigned to the prospective attendees based on their role in a task or decision, and not on their position in an organizational hierarchy. In such an example, a meeting or event may be scheduled if the weighted total for all attendees or the weighted average per attendee exceeds a pre-set threshold. This is one way of ensuring that decisions are made even if a senior person cannot attend.

In determining a proposed schedule for the event or meeting, the Scheduler process is triggered or initiated by the message and in response submits one or more queries to a database that stores the preference data for the prospective attendees. It also typically submits one or more queries to a database that stores data regarding the availability of resources, such as meeting rooms, Audio-Visual equipment, catering, etc. as a function of day and time (and if desired, location).

In some embodiments, the Scheduler may be implemented as an engine or processor that executes a script and applies certain operations to the received message. An example of such a script (which applies a specific decision/resolution strategy) follows:

Script gets from Event Request triggering script:
   Get organizer/owner
   Get additional attendees
   Get Target times (if any)
   Title of event Script finds Event preferences linked to attendees:
   Script looks up preferences attached to attendees
   Assign a hierarchy to preferences based on user hierarchy
      This could either be by simple employee/supervisor hierarchy or by more advanced "employee level" tracking. Greater weight is given to people higher in organization—i.e., always make execs happy.
   If all same level, give greater weight to organizer.

Script gets possible Conference Rooms (if organizer and 1+ attendee in same office location):
   lookup if any preferred conference rooms, give greater weight to preferences of people higher in org. If all same, give weight to organizer.
   lookup other rooms for location
   Could also look up and attempt to book rooms for other locations, if multiple attendees in other locations Script proceeds like a user would:
   If a target range/date/time of day is specified in event request, looks for time slots where everyone is available
   Takes into account employee hierarchy
   Takes into account how booked people are in the target range
   If no target specified, starts looking next business day
   When possible time found, looks for room available. If no room available, can still offer as option with web conference tool
   Script saves option and repeats to find other possible times Script repeats above until 3 options found; at least one conference room option if organizer and +1 attendee in same home office.

In this example, once the Scheduler process has identified three options, it generates and sends a message (e.g., emails or text messages) back to the set of prospective users/attendees. The messages may contain options and instructions on how to select a desired option (as suggested by step or stage 440 of FIG. 4(*b*)). In some embodiments, selecting an option could be indicated by replying with certain words or phrases (such as "option 3", or "number 1"), or could be performed by selecting a link to submit a preference for an option. In some embodiments, the Scheduler may send each user/attendee a copy of their personal calendar for a range of dates so that they can make an informed decision. An example of such a message (in the form of an email) is shown in FIG. 4(*b*)(1).

Note that in terms of implementation, the inventive Scheduler can be built as part of a larger business/calendaring application, thereby taking advantage of access to an integrated set of information already in that system. For example, on a service platform or server (or a network of such platforms or servers) that contains data regarding users' calendar, meeting preferences, time zone, and resources, the data associated with a user's account may be accessed by the Scheduler in order to implement the scheduling processes. In such a situation, a suitable scripting or other form of command language can be used to query calendars and events, and also to create events. An embodiment of the inventive Scheduler could also be implemented as a stand-alone application that integrates with other data sources, such as software applications for financial/sales/business management, services automation, human resources, public or private calendaring, and time off/holiday/vacation/PTO management.

Typically, one or more of the users/attendees may wish to discuss the options or offer a new proposal to others of the users/attendees. Conventionally, this might involve an exchange of multiple rounds of messages using a different mode of communication and/or a dedicated messaging application. However, because the inventive Scheduler process is using a messaging environment to present the options, the users/attendees can more easily discuss the proposed event or meeting in a natural and convenient manner. For example, by using the existing messaging and information distribution capabilities of a messaging application, the Scheduler process permits decisions to be made faster and with greater acceptance by those involved (as suggested by step or stage 442 of FIG. 4(*b*)).

During the discussion of event options, the Scheduler process can continue to monitor the messages. One of the benefits of this monitoring is that the Scheduler can query certain dates or times that appear in the discussion and quickly return availability information for the attendees for those dates or times. The Scheduler may also be linked to a company calendar, therefore be aware of company-wide events that might be taking place on discussed dates. The Scheduler may also have access to data contained in a personal time off (PTO) management system, and can remind individual attendees of their upcoming time-off events in case of a conflict with the discussed dates. The Scheduler process can send out updates as the discussion continues among the attendees, thereby assisting in reaching a faster decision for the event date and time.

By monitoring the discussion, if new people are added to the communication thread, then the Scheduler can look up relevant preference data and provide options that include the new person or persons. In some embodiments, the Scheduler may suggest additional attendees to an event based on their past attendance at the same or a similar event, and/or a correlation between the attendance at events by one or more attendees and another person who is not presently invited to the current event. For example, from information in a calendaring or human resources system, it might suggest attendees based on one or more of the following:

Shared past events—i.e., there are many events with Joe, Bob, and Sue, so if Joe and Bob are meeting it might suggest to invite Sue;

Topic—if others are commonly attendees at meetings with the subject being discussed, it could suggest those people as possible attendees; or Role or position in the company—by accessing HRIS information, the scheduler process can find people in similar roles, locations or departments, or could find recent replacements of termed employees that may have been attendees at previous similar meetings (in which case the replacement would be invited).

Note that any suggestions for potential attendees may be provided with information such as name, title, department, etc. in order to provide context to help the meeting planners decide whether to invite the potential attendee.

Another embodiment may incorporate a process to capture data and "learn" how to more optimally perform the scheduling process. For example, the Scheduler process may capture information or preferences about an attendee that can be used to improve the suggested event options; it may notice a phrase such as "next Friday doesn't work" from a certain attendee and then add that to a short term event preference for that user (in order to not suggest events for the next Friday). Monitoring the discussions between potential attendees may also be the source of longer term changes to user preferences; for example, if an attendee routinely rejects Friday options, then the process could learn to set this event preference for the user.

If a discussion has occurred, then once agreement has been reached and a decision has been made, the event or meeting organizer generates and sends an email/message to the Scheduler process (and, if desired, to the users/attendees), as suggested by step or stage 450 of FIG. 4(*c*). This message selects a desired option or options for the event or meeting (note that the Scheduler may be configured to send such a confirmation message to the users/attendees upon receipt of one from the organizer, as described further). An example of such a message (in the form of an email) is shown in FIG. 4(*c*)(1). Upon receipt of the message from the organizer, the Scheduler process creates an event based on the selected option, as suggested by step or stage 452 of FIG. 4(*c*). The Scheduler process may also generate and send a message to each of the prospective users/attendees. An example of such a message (in the form of an email) is shown in FIG. 4(*c*)(2). This message may contain a link or field which the recipient can use to acknowledge receipt of the message and their expected attendance at the event or meeting. Activating the link or entering data into the field may cause the event or meeting to be entered in the recipient's calendar or supplied to a similar application.

Embodiments of the inventive integrated scheduling and messaging (or communications) system and methods provide significant advantages over conventional scheduling systems. Such advantages include, but are not limited to:

Scheduling an event within or as a paradigm of an email/messaging conversation allows for a natural and familiar discussion amongst the prospective attendees and their evaluation of the event options, and provides an effective mechanism for creating events without being required to log into a dedicated application or platform;

If desired, information contained in a message used to initiate a scheduling process might be used to select a set of rules, constraints, or scheduling guidelines in order to apply the most relevant criteria when determining scheduling parameters and options;

If desired, the inventive Scheduler can give more weight to the preferences of certain employees or prospective attendees (e.g., based on the organizational hierarchy, availability of guests, etc.);

The Scheduler processes may be enhanced to take advantage of other information available on a business data processing platform that stores and processes business related data; for example, company calendars, fiscal/sales calendars (in order to leave people with more free time during month/quarter end, no meetings during company picnic, etc.), due dates/events from other records, etc. and use this information when determining event options (e.g., don't schedule a meeting right before an important customer demo); and Possible inter-account event scheduling; a Scheduler process operating in one account of a multi-tenant platform might be configured to operate with a Scheduler process operating in another account to schedule events across accounts.

Note that in addition to being used to schedule an event or meeting in response to an initial message or communication from an event or meeting organizer, an embodiment of the inventive scheduling system and methods may be configured to be triggered by recognizing certain conditions within a business environment. For example, the inventive scheduler process may actively initiate the scheduling of an event or meeting in response to a state of the business (quarter-end, year-end, exceeding a revenue goal, reaching a certain inventory level, prior to an important product demo, at the close of a significant agreement, at a specific achievement that is measured quantitatively, near the expiration of a contract, etc.). This allows the scheduler to proactively propose a meeting in response to a change in the business, to a change in the business environment, or to a change in the operations of the business, and to intelligently select a set of potential attendees.

Figure 5:
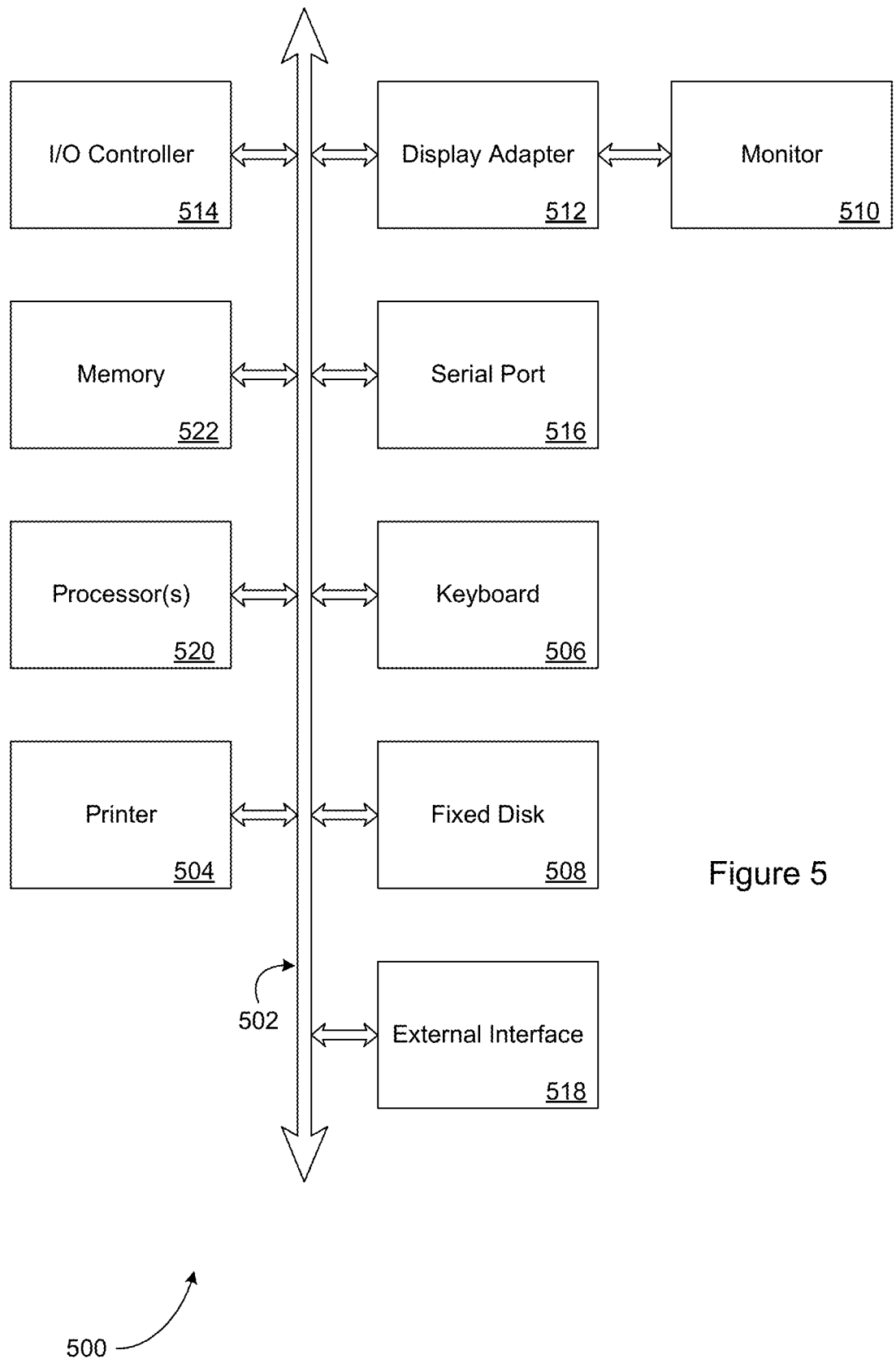
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for automating a scheduling process or task may be wholly or partially implemented in the form of a set of instructions executed by one or more programmed computer processors such as a central processing unit (CPU) or microprocessor. Such processors may be incorporated in an apparatus, server, processing platform, client or other computing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A computer implemented method for scheduling a meeting or event, comprising:

receiving at a specific email address associated with a scheduling process an email message from an organizer of a proposed meeting or event addressed to both (i) other attendees of the proposed meeting or event and (ii) the specific email address;

routing the received email message from the specific email address to the scheduling process to initiate the scheduling process;

processing, by the scheduling process, the received email message to determine certain information related to the proposed meeting or event;

based on the determined information, accessing, by the scheduling process, data regarding the scheduling preferences for one or more of the attendees of the proposed meeting or event, wherein the scheduling preferences are derived at least in part from monitoring text communications of the one or more of the attendees to detect the scheduling preferences, and wherein the data regarding the scheduling preferences are related to one or more of a role, a location, or a past attendance at meetings or events for an attendee;

based at least in part on the scheduling preferences, determining, by the scheduling process, one or more possible options of date, time, or location for scheduling the proposed meeting or event, wherein the possible options include a possible option occurring on days that are least busy for at least one of (i) greatest number of attendees, (ii) the organizer, or (iii) most senior attendees and offering buffer time between the meeting or event and other meetings or events for at least one of (i) greatest number of attendees, (ii) the organizer, or (iii) most senior attendees;

generating, by the scheduling process, a generated email message to one or more of the attendees of the proposed meeting or event, the generated email message including the one or more possible options for scheduling the proposed meeting or event and suggesting one or more additional attendees of the proposed meeting or event;

receiving, by the scheduling process, a selection email message from the organizer of the proposed meeting or event, the received selection email message including a selection of one of the one or more possible options for scheduling the proposed meeting or event; and in response to receiving, from the organizer, the selection email message including the selected option, scheduling, by the scheduling process, the proposed meeting or event based on the selected option by generating and sending a scheduling email message to each of the attendees of the proposed meeting or event, wherein the scheduling email message contains a link that, when selected by the attendee, (i) acknowledges, to the scheduling process, receipt of the scheduling email message and indicates the expected attendance of the attendee at the meeting or event; and (ii) automatically generates a calendar entry for the meeting or event in a calendar of the attendee.

2. The method of claim 1, wherein processing the received email message to determine certain information related to the proposed meeting or event further comprises executing a script or instruction that identifies specific information in the received email message, and further wherein the specific information includes one or more of the proposed attendees, or the organizer of the meeting or event.

3. The method of claim 1, wherein accessing data regarding the scheduling preferences for one or more of the attendees of the proposed meeting or event further comprises accessing data related to one or more of the role, the location, or the past attendance at meetings or events for one or more of the attendees.

4. The method of claim 1, wherein determining one or more possible options for scheduling the proposed meeting or event further comprises applying one or more of a rule, heuristic, or decision process to identify one or more options for scheduling the proposed meeting or event, wherein application of the rule, heuristic, or decision process involves consideration of one or more of the seniority, the role, or the function of one or more of the attendees of the proposed meeting or event.

5. The method of claim 1, further comprising:

accessing a specific set of rules, constraints, or scheduling guidelines in response to identifying one or more of the proposed attendees, the subject or purpose of the meeting or event, or the organizer of the meeting or event;

scoring the one or more possible options for scheduling the proposed meeting or event based on the one or more possible options satisfying one or more of the rules, constraints, and scheduling guidelines; and excluding from the possible options those options with a score that does not exceed a threshold.

6. The method of claim 5, wherein the rules, constraints, or scheduling guidelines include best fit of a possible option with a preference of most senior attendees of the meeting.

7. The method of claim 5, wherein the rules, constraints, or scheduling guidelines include best fit of a possible option with a preference of the organizer.

8. The method of claim 1, further comprising:

monitoring communications between one or more of the attendees of the proposed meeting or event, the monitored communications being written in response to the generated email message including the one or more possible options for scheduling the proposed meeting or event; and sending an updated email message to one or more of the attendees of the proposed meeting or event, the updated email message including information relevant to dates discussed in the monitored communications.

9. The method of claim 1, wherein the scheduling process operates in a first account of a multi-tenant platform, and a second scheduling process operates in a second account of the multi-tenant platform, the method further comprising scheduling the proposed meeting or event across the first and second accounts.

10. The method of claim 1 wherein the suggesting, by the scheduling process, an additional attendee for the meeting is based on past attendance of the additional attendee at an event similar to the proposed meeting or event.

11. The method of claim 1 wherein the suggesting, by the scheduling process, an additional attendee for the meeting is based on a correlation between the attendance at other events of the additional attendee and one or more of the attendees of the proposed meeting or event.

12. The method of claim 1, wherein:

the data regarding the scheduling preferences for one or more attendees is accessed for each of the one or more attendees; and the scheduling preferences are derived at least in part from monitoring the communications of each of the one or more attendees.

13. The method of claim 1, wherein:
- processing the received email message to determine certain information related to the proposed meeting or event further comprises executing a script or instruction that identifies one or more of the proposed attendees of the meeting or event from the received email message;
- accessing data regarding the scheduling preferences for one or more of the attendees of the proposed meeting or event further comprises accessing data related to one or more of the role, the location, or the past attendance at meetings or events for the one or more of the attendees; and
- determining one or more possible options for scheduling the proposed meeting or event further comprises applying one or more of a rule, heuristic, or decision process to identify one or more options for scheduling the proposed meeting or event, wherein application of the rule, heuristic, or decision process involves consideration of one or more of the seniority within a business organization, the role within the business organization, or the function within the business organization of the one or more of the attendees of the proposed meeting or event.

14. The method of claim 1, wherein accessing data regarding the scheduling preferences for one or more of the attendees of the proposed meeting or event further comprises accessing data related to past attendance at meetings or events for one or more of the attendees.

15. The method of claim 1, wherein the received email message is addressed to the specific email address as a carbon copy.

16. A system for scheduling a meeting or event, comprising:
- one or more business related data processing applications installed in the system;
- a data storage element coupled to the one or more business related data processing applications;
- a processor programmed with a set of instructions, wherein when executed by the processor, the instructions cause the system to:
  - receive at a specific email address associated with a scheduling process an email message from an organizer of a proposed meeting or event addressed to both (i) other attendees of the proposed meeting or event and (ii) the specific email address;
  - route the received email message from the specific email address to the scheduling process to initiate the scheduling process;
  - process, by the scheduling process, the received email message to determine certain information related to the proposed meeting or event;
  - based on the determined information, access, by the scheduling process, data regarding the scheduling preferences for one or more of the attendees of the proposed meeting or event, wherein the scheduling preferences are derived at least in part from monitoring text communications of the one or more of the attendees to detect the scheduling preferences, and wherein the data regarding the scheduling preferences are related to one or more of a role, a location, or a past attendance at meetings or events for an attendee;
  - based at least in part on the scheduling preferences, determine, by the scheduling process, one or more possible options of date, time, or location for scheduling the proposed meeting or event, wherein the possible options include a possible option occurring on days that are least busy for at least one of (i) greatest number of attendees, (ii) the organizer, or (iii) most senior attendees and offering buffer time between the meeting or event and other meetings or events for at least one of (i) greatest number of attendees, (ii) the organizer, or (iii) most senior attendees;
  - generate, by the scheduling process, a generated email message to one or more of the attendees of the proposed meeting or event, the generated email message including the one or more possible options for scheduling the proposed meeting or event and suggesting one or more additional attendees of the proposed meeting or event;
  - receive, by the scheduling process, a selection email message from the organizer of the proposed meeting or event, the received selection email message including a selection of one of the one or more possible options for scheduling the proposed meeting or event; and
  - in response to receiving, from the organizer, the selection email message including the selected option, schedule, by the scheduling process, the proposed meeting or event based on the selected option by generating and sending a scheduling email message to each of the attendees, wherein the scheduling email message contains a link that, when selected by the attendee,
    - (i) acknowledges, to the scheduling process, receipt of the scheduling email message and indicates the expected attendance of the attendee at the meeting or event; and
    - (ii) automatically generates a calendar entry for the meeting or event in a calendar of the attendee.

17. The system of claim 16, wherein the one or more business related data processing applications installed in the system include an application for processing one or more of calendaring data, enterprise resource planning data, customer relationship management data, human resources data, eCommerce data, personal time-off data, or financial data.

18. The system of claim 16, wherein processing the received email message to determine certain information related to the proposed meeting or event further comprises executing a script or instruction that identifies specific information in the received email message, and further wherein the specific information includes one or more of the proposed attendees, or the organizer of the meeting or event.

19. The system of claim 16, wherein accessing data regarding the scheduling preferences for one or more of the attendees of the proposed meeting or event further comprises accessing data related to one or more of the role, the location, or the past attendance at meetings or events for one or more of the attendees.

20. The system of claim 16, wherein determining one or more possible options for scheduling the proposed meeting or event further comprises applying one or more of a rule, heuristic, or decision process to identify one or more options for scheduling the proposed meeting or event, wherein application of the rule, heuristic, or decision process involves consideration of one or more of the seniority, the role, or the function of one or more of the attendees of the proposed meeting or event.

21. The method of claim 16, further comprising:
- accessing a specific set of rules, constraints, or scheduling guidelines in response to identifying one or more of the proposed attendees, the subject or purpose of the meeting or event, or the organizer of the meeting or event;

scoring the one or more possible options for scheduling the proposed meeting or event based on the one or more possible options satisfying one or more of the rules, constraints, and scheduling guidelines; and excluding from the possible options those options with a score that does not exceed a threshold.

22. The system of claim 16, further comprising:

monitoring communications between one or more of the attendees of the proposed meeting or event, the monitored communications being written in response to the generated email message including the one or more possible options for scheduling the proposed meeting or event; and sending an updated email message to one or more of the attendees of the proposed meeting or event, the updated email message including information relevant to dates discussed in the monitored communications.

23. The system of claim 22, further comprising using dates and times appearing in discussion obtained from the monitoring of the communications to generate a possible option for the scheduling of the proposed meeting or event.

24. An apparatus for scheduling a meeting or event, comprising:

an electronic data processing element;

a set of instructions stored on a non-transient medium and executable by the electronic data processing element, which when executed cause the apparatus to:
- a specific email address associated with a scheduling process an email message from an organizer of a proposed meeting or event addressed to both (i) other attendees of the proposed meeting or event and (ii) the specific email address;
- route the received email message from the specific email address to the scheduling process to initiate the scheduling process;
- process, by the scheduling process, the received email message to determine certain information related to the proposed meeting or event;
- based on the determined information, access, by the scheduling process, data regarding the scheduling preferences for one or more of the attendees of the proposed meeting or event, wherein the scheduling preferences are derived at least in part from monitoring text communications of the one or more of the attendees to detect the scheduling preferences;
- based at least in part on the scheduling preferences, determine, by the scheduling process, one or more possible options of date, time, or location for scheduling the proposed meeting or event, wherein the possible options include a possible option occurring on days that are least busy for at least one of (i) greatest number of attendees, (ii) the organizer, or (iii) most senior attendees and offering buffer time between the meeting or event and other meetings or events for at least one of (i) greatest number of attendees, (ii) the organizer, or (iii) most senior attendees;
- generate, by the scheduling process, a generated email message to one or more of the attendees of the proposed meeting or event, the generated email message including the one or more possible options for scheduling the proposed meeting or event;
- receive, by the scheduling process, a selection email message from the organizer of the proposed meeting or event, the received selection email message including a selection of one of the one or more possible options for scheduling the proposed meeting or event; and
- in response to receiving, from the organizer, the selection email message including the selected option, schedule, by the scheduling process, the proposed meeting or event based on the selected option by generating and sending a scheduling email message to each of the attendees of the proposed meeting or event, wherein the scheduling email message contains a link that, when selected by the attendee,
  - (i) acknowledges, to the scheduling process, receipt of the scheduling email message and indicates the expected attendance of the attendee at the meeting or event; and
  - (ii) automatically generates a calendar entry for the meeting or event in a calendar of the attendee.

* * * * *